United States Patent Office

3,772,432
Patented Nov. 13, 1973

3,772,432
CARTILAGE COMPOSITIONS FOR DENTAL USE
Leslie L. Balassa, Blooming Grove, N.Y., assignor to Lescarden Ltd., Goshen, N.Y.
No Drawing. Filed Jan. 11, 1971, Ser. No. 105,662
Int. Cl. A61k 5/00, 17/00
U.S. Cl. 424—95                                    17 Claims

ABSTRACT OF THE DISCLOSURE

Cartilage powder is described herein for use in dental applications including the treatment and prevention of dry sockets, gingival tissues and mandibular cystectomies, the cartilage powder being used in the form of a paste of low mobility.

---

This invention relates to the treatment and prevention of dry sockets, gingival flaps and mandibular cystetcomies in the oral cavity by the local administration of cartilage powder.

About 10% of all tooth extractions in the United States result in "dry sockets" which are a form of mild osteomyelitis. This condition is extremely painful to the patient and the excrutiating painful phase of dry sockets last between one and two weeks. Dry sockets also heal much slower than other extraction sockets. Up to the present time no cure or effective treatment has been found for dry sockets and the intense pain had to be depressed with large doses of sedatives administered at frequent intervals.

It has now been surprisingly discovered that dry sockets can be prevented and treated by the use of cartilage powder, preferably in paste form, such cartilage powder having been previously described in the art (i.e. U.S. Pats. 3,400,199, 3,476,855, and 3,478,146).

In addition it has been discovered that cartilage powder has other dental applications including the treatment of mandibular cystectomies, gingival flaps and periodontal tissues.

Accordingly, one aspect of the present invention provides for the treatment of dry sockets in a patient by applying to the dry socket an effective quantity of cartilage powder.

Another aspect of the present invention relates to a composition comprising a cartilage powder combined with an isotonic saline solution for treating and preventing dry sockets.

Yet another aspect of the present invention is to provide a cartilage powder containing composition effective for numerous dental applications including the treatment of gingival flaps and mandibular cystectomies.

These and other aspects of the present invention will become apparent from the following description.

As used throughout the specification "cartilage product" means cartilage powder and/or cartilage extract (either solid or liquid) which is derived from granulated cartilage.

The cartilage product used in the compositions of the present invention are known in the art and have been described in U.S. Pats. 3,400,199; 3,476,855; 3,478,146; the disclosures of which are incorporated herein by reference. The cartilage powder is preferably derived from young cartilage, i.e. from young animals or young or newly regenerated cartilage from older animals as reptiles or from species such as fish or shark which remain young eternally. Where age is the criteria for defining "young" the cartilage is preferably derived from animals not over six months old. However, cartilage powder derived from the cartilage of older animals may also be employed but it is not as effective.

The cartilage may be prepared by any suitable means to result in a product which is essentially pure cartilage substantially free from adhering tissue which may have been removed by acid-pepsin or other suitable enzyme treatment, with or without mechanical assistance or otherwise.

The cartilage powder used in accordance with the present invention is pulverized to an average particle size of less than about 150 microns. Optimum results are obtained where the average particle is below about 70 microns with the preferred range being about 15 to 45 microns. The cartilage powder may be pulverized by any number of techniques including ball milling, hammer milling in an inert atmosphere, pebble milling and fluid energy mill grinding.

The cartilage extracts are obtained by the use of aqueous extracting agents which dissolve the active components of the cartilage powder. The extract is therefore a product from which a substantial portion of the non-active components have been removed and hence has a higher concentration of activity per unit dose. Examples of suitable extraction aids include ammonia or ammonium carbonate, or such materials which if remaining in the extract would cause no harm. Dialysis may be employed to remove undesired salts or other dialyzable material which may be present. Other extraction aids are urea, sodium citrate, disodium phosphate, trisodium phosphate, sodium formate, sodium chloride and similar compounds or mixtures of them.

The cartilage product is preferably used for the dental applications in the form of a high viscosity (low mobility) paste prepared by mixing the cartilage powder or solid cartilage extract with sufficient liquid to result in a paste of putty-like consistency which is suitable for packing into a socket of the jawbone after a tooth has been extracted. The cartilage powder may also be used in the form of a liquid suspension or extract for local administration by injection. The liquid used to form the paste with the cartilage product is preferably isotonic saline solution which is commercially available and used today in dental offices. Other liquids may also be used to form the paste including distilled water, ammonium carbonate, sodium citrate solution, sodium formate solution, urea solution, trisodium phosphate solution as well as other liquids that are also suitable for preparing the cartilage extract as previously described. The cartilage paste may also be prepared by mixing cartilage powder and cartilage extract in liquid form in such proportions to obtain the desired viscosity.

The cartilage powder or extract may also be suspended in oils such as tung oil, corn oil, olive oil, or linseed oil. The oil dispersions may be emulsified in water, forming oil-in-water type emulsions, or conversely, water may be emulsified in the oil dispersions forming water-in-oil emulsions.

The cartilage paste may be further modified by adding to it gelatin, collagen, albumin, carrageenin, proteins (e.g. casein, soy protein, gluten); starches, dextrins, cellulose esters and ethers, starch esters and ethers; water soluble or water swellable vegetable or synthetic gums or resins. Other additives include humectants such as glycerol or polyalkylene glycols; mild surfactants such as stearyl mono and diglycerides, sorbitan ester of long chain fatty acids, etc.

The cartilage product and saline solution may be sterilized with all of its additives, if any, as the final step in the prepartion of the cartilage paste. The cartilage paste can be prepared just before use by combining the cartilage product with the selected liquid which in the case of isotonic saline solution is in the ratio of about 70 to 30 parts by weight cartilage product to 30 to 70 parts of isotonic saline solution depending on the consistency desired. Alternatively the paste may be packaged in single or multi-dosage packages such as "squeeze tubes" which are ready to use by the dentist.

The following examples are illustrative of cartilage powders and cartilage extracts useful for preparing a cartilage paste having numerous dental applications.

EXAMPLE I.—CARTILAGE PEBBLE MILL-GROUND

The tracheas of healthy adult beef cattle were removed within 30 to 60 minutes after the animals were slaughtered. The tracheas were then either processed immediately with an acid-pepsin solution or they were frozen to preserve them, in which case the acid-pepsin digestion may be deferred. The tracheas either fresh or previously frozen were then digested for about six hours at 50° C. in an aqueous solution containing 0.6% acetic acid (U.S.P. glacial) and 0.3% pepsin (N.F. IX grade, 3500 activity). After digestion the tracheal cartilage was removed from the acid-pepsin solution, washed first with water of about 70° C. and then with water of about 25° C. until the effluent wash water showed no trace of pepsin or acetic acid. The cartilage was dried in vacuum (20 mm. mercury) at 80° C. The dried cartilage was defatted by extracting it with a solvent, such as hexane. It was then granulated.

The granulated purified cartilage was ground to a fine powder in a laboratory four-quart size porcelain jar mill, loaded with one-inch size (average) flint pebbles in a weight ratio of 1 cartilage to 2 pebbles. Dry Ice ($CO_2$) was then put on top of the mill charge and the mill was kept open for 5 minutes to allow the $CO_2$ to displace the air in the mill. The lid of the mill was then clamped on tight and the mill rotated as is customary in the performance of the grinding operation. The grinding was carried out at about −20° C. for 96 hours. The ground cartilage was screened through a 325 mesh nylon screen, thereby confining the active cartilage powder to paticles less than about 40 microns in size, and having average or majority particle size between about 5 and 10 microns.

EXAMPLE II

Cartilage obtained from the tracheas of a one month old calf was obtained by the same procedure as described in Example I and the resulting cartilage was ground to an average particle size of about 40 microns.

Cartilage powder may also be obtained from cartilage sources such as pigs, lambs, goats, jaw-bone of sharks, rodents, rib cage of crocodiles, birds, fish, etc. Reptile cartilage is particularly desirable in view of the ability of reptiles to regenerate their tissues and even their limbs. More details on the obtaining of cartilage powder from these and other sources will be found in U.S. Pat. 3,400,199.

EXAMPLE III

Liquid cartilage extracts were prepared as follows:

The cartilage obtained from a one day old calf was acid-pepsin digested as in Example I, granulated, and then without drying was suspended in the extracting liquid, isotonic saline solution, and then transferred into a pebble mill which was charged to 50% of its volume with flint pebbles of average size, one inch diameter. The ratio of the cartilage to extracting liquid was kept to 25:75. The liquid suspension was charged into the mill in a quantity just sufficient to fill the voids of the pebbles with the top of the pebbles barely covered by the liquid. The air was then purged from the mill with nitrogen and the mill closed. The mill was allowed to run for 6 hours at between 3° C. and 4° C. which resulted in a medium fine grinding of the cartilage and in the simultaneous extraction of the active wound-healing agent from the cartilage.

At the end of the 6-hour cycle, the mill was emptied, the fluid paste strained free of the pebbles, the fluid transferred into a centrifuge operated at 6000 r.p.m. and at a temperature of between 3° C. and 4° C. After one-half hour the centrifuge was stopped and the supernatant liquid strained through a 400 mesh nylon screen. If the strained extract was cloudy, it was returned to the centifuge and the centrifuging repeated until a clear slightly opalescent extract was obtained.

The extracts were stored at 4° C. preserved with 1:10,000 sodium ethyl mercuric thiosalicylate.

EXAMPLE IV

Powder cartilage extracts were prepared as follows:

A laboratory "Bowen" type spray dryer was used with the following modifications. In place of the oil furnace, electric heating coils were used to supply the heat energy necessary for the evaporation of the volatile portions of the extracts. Instead of air, nitrogen was used for the hot gas. A vaned disc, rotating at about 20,000 r.p.m. was used to atomize the extracts. The inlet gas temperature was held to about 280° F., the outlet temperature was between 140° F. and 160° F. The dryer was used as a closed system dryer with the exclusion of oxygen to avoid degrading the active material during the evaporation of the water.

The dry extract produced contained 6.2 percent solids and had a slightly yellow appearance. The "solids percent" means percent of solids in the extracting liquid as determined by drying at 100° C. for two hours.

The spray-dried extract powder is stored in tightly closed glass jars in a refrigerator at 4° C.

The following example illustrates the preparation of the cartilage paste of the present invention and its use for dental applications. The figures given represent parts by weight.

EXAMPLE V

|  | Stiff [1] | Medium [1] | Soft [1] |
|---|---|---|---|
| Calf cartilage powder of Example 2 | 70 | 50 | 30 |
| Isotonic saline solution (0.9% NaCl) | 30 | 50 | 70 |

[1] Refers to consistency characteristic of paste.

The paste in each case was prepared by weighing out the cartilage powder and placing it on a glass plate. The saline solution was added gradually and under constant mixing with a spatula. When a homogenous, well dispersed, lump-free paste was obtained it is ready for use.

The paste is used by introducing it directly in the dry socket, approximately 70% of its depth. The medium consistency paste was found to be the most easy to apply and it stayed in the sockets for almost a day. The stiff paste was somewhat less effective in relieving the pain from dry sockets but it resisted the action of saliva more than the medium paste and stayed in the socket two days. The soft paste was flushed out of the dry sockets by saliva within about two hours.

The cartilage paste of this invention substantially stopped the pain from dry sockets in dental patient within 15 to 30 minutes after application of the paste, the time being related to the consistency of the paste. The dry sockets so treated healed in a somewhat shorter time than is expected for normal extract sockets to heal. When the dry sockets were closed with a dental adhesive bandage or with a suture in the gum flaps, the cartilage paste of all three consistencies stayed in the socket throughout the healing period.

The cartilage paste has also been used to treat extraction sockets as a prophylactic measure. Such treatment prevents the occurrence of dry sockets in human beings.

As previously indicated the cartilage product has use in other dental applications such as treatment of gingival flaps and mandibular cystectomies. Thus, the cartilage paste has been inserted in the filling of tooth cavities in combination with the amalgam filling. Without the cartilage paste such cavities when closed with the filling result in extremely painful pressure developing in the cavity thereby frequently necessitating the reopening of the cavity and treating the exposed nerve before the cavity can be refilled again. The inclusion of the cartilage paste in the cavity eliminates any pain that would otherwise result from exposed nerves in the cavity.

In the case of gingival flaps of various kinds, the cartilage paste is spread with a dental spatula in a thin layer on the under surface of the tissue prior to its fixation. Alternatively the cartilage product can be applied by the atomization of cartilage powder or cartilage extract with an appropriate atomizer to form a thin "frost" on the surfaces which are to be opposed.

The cartilage compositions described herein may be used alone or in combination with wound healing accelerators such as polymeric N-acetyl-glycosamine (e.g. chitin) eggshell powder, etc. or antibiotics such as penicillin and other medicaments where it is desired to obtain some special additional effect.

What is claimed is:

1. A method of treating a dry socket in the oral cavity which comprises locally administering to a patient in the oral cavity site of said dry socket a composition comprising an effective quantity for treating dry socket of a non-interposing cartilage product having an average particle size no greater than about 150 microns.

2. A method according to claim 1 wherein said cartilage product is shark cartilage.

3. A method according to claim 1, wherein said cartilage product is fish cartilage.

4. A method according to claim 1, wherein said cartilage product is young cartilage.

5. A method according to claim 1 wherein said cartilage product is reptilian cartilage.

6. A method according to claim 5 wherein said cartilage product has an average particle size below about 70 microns.

7. A method according to claim 1 wherein said cartilage product is administered in the form of a paste.

8. A method according to claim 7 wherein the liquid used to form said paste comprises an isotonic saline solution.

9. A method according to claim 7 wherein said cartilage product has an average particle size between about 15 and about 45 microns.

10. A method of treating and preventing a dry socket in the oral cavity which comprises locally administering to a patient in the oral cavity site of said dry socket a composition comprising an effective quantity for treating and preventing dry socket of a non-interposing cartilage powder in paste form, said cartilage powder having an average particle size no greater than about 70 microns.

11. A method according to claim 10 wherein said cartilage powder is young cartilage in paste form.

12. A method according to claim 11 wherein said paste includes an isotonic saline solution.

13. A method according to claim 11 wherein said paste comprises between about 70–30 parts by weight of said cartilage powder and between 30–70 parts by weight of said isotonic saline solution.

14. A method according to claim 1 wherin said cartilage product is derived from shark cartilage.

15. A method according to claim 14 wherein said cartilage containing product is young cartilage in paste form.

16. A method according to claim 14, wherein said cartilage product is reptilian cartilage in paste form.

17. A method according to claim 14, wherein said cartilage product is fish cartilage in paste form.

References Cited

UNITED STATES PATENTS 3,400,199  9/1968  Balassa _____ 424—95

OTHER REFERENCES

Bonnette et al., J. Oral Surgery, vol. 26, pp. 185–187, March 1968.

RICHARD L. HUFF, Primary Examiner